(12) United States Patent
Xu et al.

(10) Patent No.: US 11,963,056 B2
(45) Date of Patent: Apr. 16, 2024

(54) LAYER 2 OPERATION FOR LAYER 1 AND LAYER 2-CENTRIC INTER-CELL MOBILITY

(71) Applicant: APPLE INC., Cupertino, CA (US)

(72) Inventors: Fangli Xu, Beijing (CN); Chunhai Yao, Beijing (CN); Dawei Zhang, Cupertino, CA (US); Haijing Hu, Cupertino, CA (US); Qiming Li, Beijing (CN); Wei Zeng, Cupertino, CA (US); Yang Tang, Cupertino, CA (US); Yuqin Chen, Beijing (CN); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 327 days.

(21) Appl. No.: 17/593,228

(22) PCT Filed: Apr. 1, 2021

(86) PCT No.: PCT/CN2021/084934
§ 371 (c)(1),
(2) Date: Sep. 13, 2021

(87) PCT Pub. No.: WO2022/205310
PCT Pub. Date: Oct. 6, 2022

(65) Prior Publication Data
US 2023/0209423 A1    Jun. 29, 2023

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0033* (2013.01); *H04W 76/20* (2018.02); *H04W 76/30* (2018.02)

(58) Field of Classification Search
CPC ..... H04W 36/08; H04W 76/20; H04W 76/30; H04W 36/0033
(Continued)

(56) References Cited

U.S. PATENT DOCUMENTS

2014/0226481 A1    8/2014  Dahod
2019/0380066 A1*  12/2019  Sharma ................. H04W 36/14
(Continued)

FOREIGN PATENT DOCUMENTS

WO    2019149182 A1    8/2019
WO    2020041972 A1    3/2020

OTHER PUBLICATIONS

Ericsson , "[E232] Source and target entities at DAPS HO", Tdoc R2-2004693, 3GPP TSG-RAN WG2 #110-e, Electronic Meeting, Agenda Item 6.9.5, Jun. 1-12, 2020, 28 pages.
(Continued)

*Primary Examiner* — Obaidul Huq
(74) *Attorney, Agent, or Firm* — Dorsey & Whitney LLP

(57) ABSTRACT

Layer 2 handling during a cell change procedure includes decoding an RRC reconfiguration message received from a first cell. The RRC reconfiguration message includes a Layer 1 (L1) configuration corresponding to a second cell. The first cell and the second cell share an SDAP entity, a PDCP entity, an RLC entity, and a MAC entity. The first cell and the second cell have a separate L1 entity. In response to decoding the RRC reconfiguration message, the L1 configuration corresponding to the second cell is stored. A cell change message received from the first cell is decoded. The cell change message indicates that a cell change from the first cell to the second cell is to be performed. The stored L1 configuration corresponding to the second cell is applied for data transmission and reception associated with the second cell. A cell change to the second cell is initiated.

20 Claims, 12 Drawing Sheets

(51) Int. Cl.
*H04W 76/20* (2018.01)
*H04W 76/30* (2018.01)

(58) Field of Classification Search
USPC .................................. 370/310, 328, 329, 331
See application file for complete search history.

(56) References Cited

U.S. PATENT DOCUMENTS

| 2020/0259703 | A1  | 8/2020  | Cirik et al. |            |
|--------------|-----|---------|--------------|------------|
| 2021/0337436 | A1* | 10/2021 | Teyeb        | H04W 36/0038 |
| 2022/0303840 | A1* | 9/2022  | Chang        | H04W 36/0072 |

OTHER PUBLICATIONS

PCT/CN2021/084934, International Search Report and Written Opinion, dated Jan. 7, 2022, 9 pages.

\* cited by examiner

LAYER 2 OPERATION FOR LAYER 1 AND LAYER 2-CENTRIC INTER-CELL MOBILITY

TECHNICAL FIELD

This application relates generally to wireless communication systems, including Layer 2 operation for Layer 1/Layer 2-centric inter-cell mobility.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

By way of background, legacy handover (HO) schemes can be used for inter-cell mobility for connected user equipments (UEs), as well as intra-cell key updates for connected UEs. Legacy HO schemes have also included two HO types, including: 1. Radio link control (RLC)/medium access control (MAC) reset with packet data convergence protocol (PDCP) re-establishment; and 2. RLC/MAC reset without PDCP re-establishment. Notably, components for HO interruption time include: C1: Radio frequency (RF) retuning; C2: Downlink (DL) sync in target cell; C3: Layer 2 (L2) reset; and C4: Uplink (UL) sync in target cell.

Figure 1:
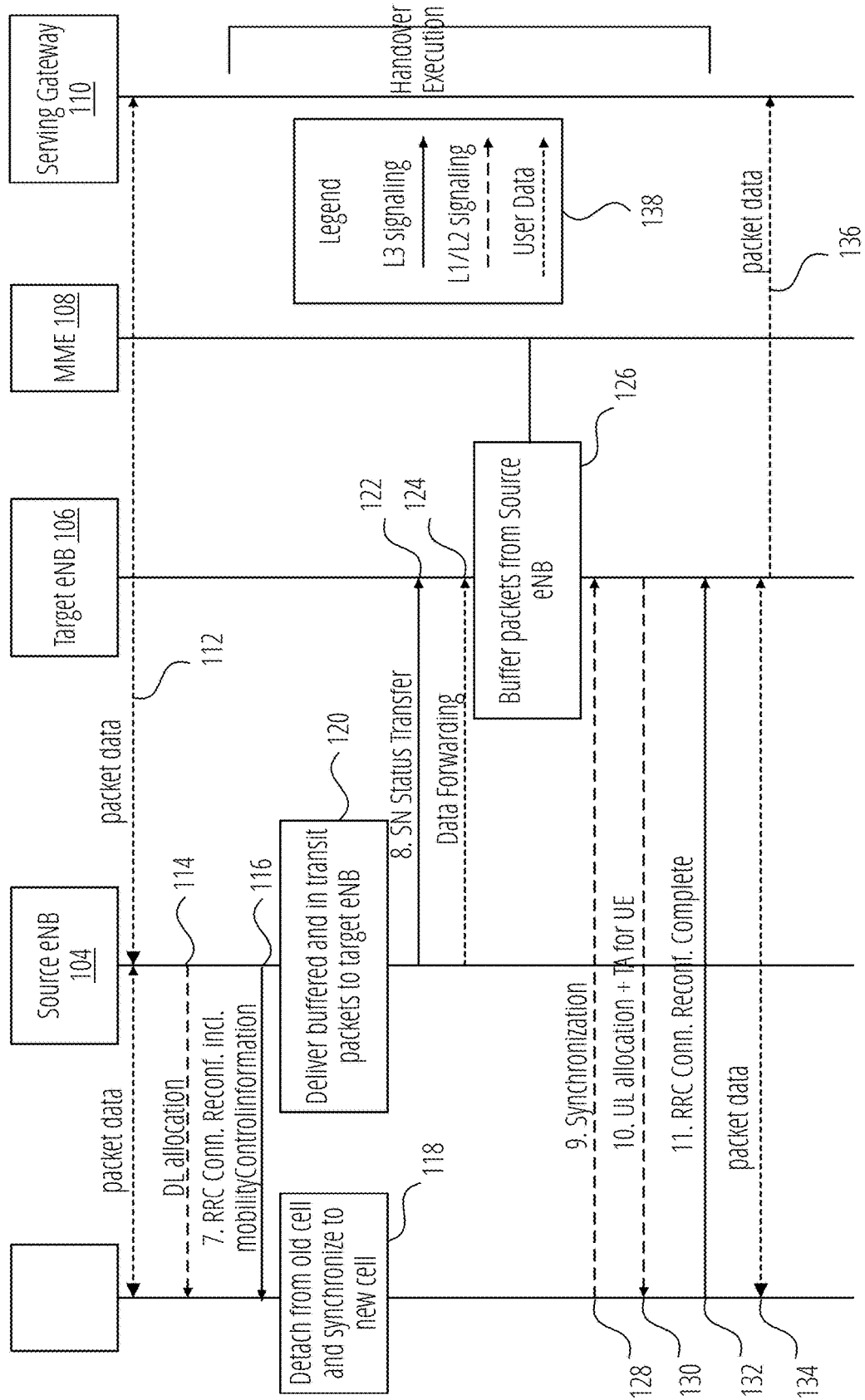
FIG. 1 illustrates an example handover data flowchart in accordance with one embodiment.

FIG. 1 illustrates an example legacy handover data flowchart. FIG. 1 includes a UE 102, a Source eNB 104, a Target eNB 106, a mobility management entity (MME) 108, and a Serving Gateway 110. As shown, packet data is transmitted between the Serving Gateway 110, the Source eNB 104, and the UE 102, as represented by arrow 112. Following such transmissions, a downlink (DL) allocation message is sent from the Source eNB 104 to the UE 102, as represented by arrow 114. The Source eNB 104 then sends a radio resource control (RRC) connection reconfiguration message that includes mobilityControlInformation to the UE 102, as represented by arrow 116. The UE 102 may then detach from the old cell (i.e., Source eNB 104) and synchronize to the new cell (i.e., Target eNB 106), as represented by block 118. In addition, the Source eNB 104 may deliver buffered and in-transit packets to the Target eNB 106 including sequence number (SN) status transfer and data forwarding, as represented by block 120, arrow 122, and arrow 124, respectively.

The Target eNB 106 in conjunction with the MME 108 may then buffer packets from the Source eNB 104, as represented by block 126. A synchronization message may then be sent from the UE 102 to the Target eNB 106, as represented by arrow 128. The Target eNB 106 may then send an uplink (UL) allocation and timing advance message to the UE 102, as represented by arrow 130. The UE 102 may then send an RRC connection reconfiguration complete message to the Target eNB 106. Packet data can then be transmitted between the Serving Gateway 110, the Target eNB 106, and the UE 102, as represented by arrow 134 and arrow 136.

Notably, as shown by legend 138, the straight line arrows each represent Layer 3 (L3) signaling (i.e., arrow 116, arrow 122, and arrow 132), the larger dotted-line arrows represent Layer 1 (L1) and Layer 2 (L2) signaling (i.e., arrow 114, arrow 128, and arrow 130), and the smaller dotted-line arrows represent user data (i.e., arrow 112, arrow 124, arrow 134, and arrow 136). In addition, handover execution occurs beginning at arrow 116 (i.e., the RRC connection reconfiguration message from the Source eNB 104 to the UE 102) and ending at arrow 132 (i.e., the RRC connection reconfiguration complete message from the UE 102 to the Target eNB 106).

Additional enhancements are to be created in 3GPP Release 17 (Rel-17), as further discussed with respect to Work Item Description (WID): Further enhancements on MIMO for NR (RP-202024), which discusses a desire for enhancements to Layer 1 (L1)/L2-centric inter-cell mobility, as well as enhancements on signaling mechanisms to improve latency and efficiency with more usage of dynamic control signaling (as opposed to radio resource control (RRC)). One such scenario for L1/L2 centric inter-cell mobility comprises a fast cell change with high frequency, including: 1. Intra-centralized unit (CU) intra-distributed unit (DU) cell change; 2. Intra-CU inter-DU cell change; and 3. Inter-CU inter-DU.

For the cell change in the intra-CU intra-DU scenario, because all L2 protocol stacks (e.g., service data adaptation protocol (SDAP)/PDCP/RLC/MAC) for a source cell and a target cell are located together, the cell change only has to occur with respect to the L1 configuration from the source cell to the target cell. Accordingly, RLC/MAC reset and PDCP reestablishment do not have to be performed.

Figure 2:
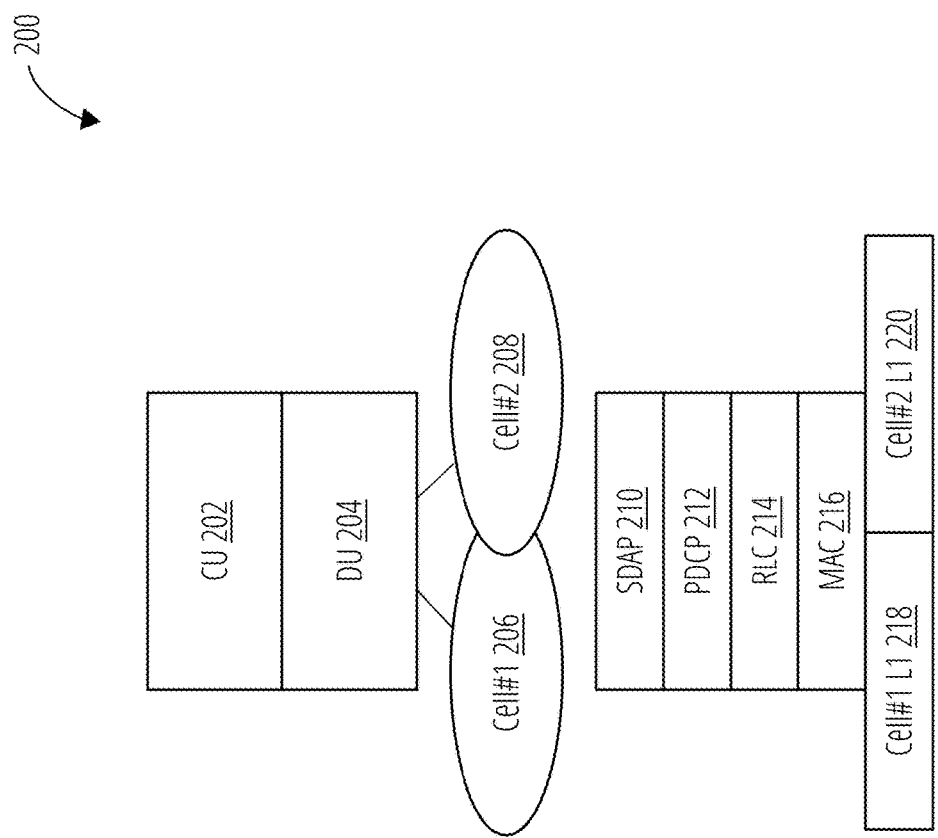
FIG. 2 illustrates a model with common L2 protocol stacks in accordance with one embodiment.

The principles described herein include a design of the L2 operation, particularly in the MAC layer, for an L1/L2 centric cell change with respect to two different L1/L2 models. FIG. 2 illustrates a first model 200 with common L2 protocol stacks that includes a CU 202, a DU 204, a Cell#1 206, a Cell#2 208, an SDAP 210, a PDCP 212, an RLC 214, MAC 216, a Cell#1 L1 218, and a Cell#2 L1 220. As shown in FIG. 2, the model 200 includes the CU 202 and the DU 204 being shared between the Cell#1 206 and the Cell#2 208. The model 200 also includes an L2 architecture having the SDAP 210, the PDCP 212, the RLC 214, and the MAC 216 entities in common and shared by both the source cell (i.e., Cell#1 206) and the target cell (i.e., Cell#2 208). In addition, the L1 configuration for the serving cell transmission is separate for the source cell and the target cell (i.e., the Cell#1 L1 218 and the Cell#2 L1 220). Applicable scenarios for the model 200 include an intra-CU intra-DU cell change and an intra-CU inter-DU with ideal backhaul.

Figure 3:
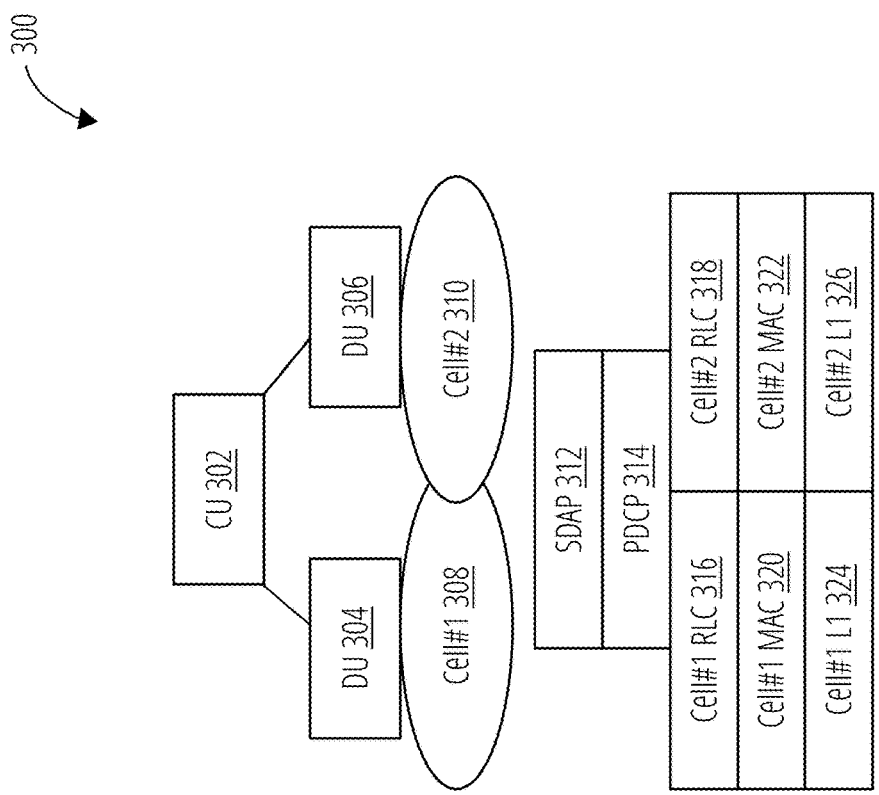
FIG. 3 illustrates a model with separate RLC/MAC entities in accordance with one embodiment.

FIG. 3 illustrates a second model 300 with separate RLC/MAC entities that includes a CU 302, a DU 306, a Cell#1 308, a Cell#2 310, an SDAP 312, a PDCP 314, a Cell#1 RLC 316, a Cell#2 RLC 318, a Cell#1 MAC 320, a Cell#2 MAC 322, a Cell#1 L1 324, and a Cell#2 L1 326. As shown, the model 200 includes an L2 architecture having the CU 302, the SDAP 312, and the PDCP 314 entities in common and shared by both the source cell (i.e., Cell#1 308) and the target cell (Cell#2 310). Accordingly, the model 300 includes separate DU, RLC, MAC, and L1 entities, as shown. Notably, the L1 configuration for the serving cell transmission is once again separate for the source cell and the target cell. Applicable scenarios for the model 300 include an intra-CU inter-DU without ideal backhaul scenario and an inter-CU inter-DU without ideal backhaul scenario.

Now solutions related to the model 200 (i.e., the model having common L2 protocol stacks for handover) at various layers are discussed, followed by solutions related to the model 200 (i.e., the model having separate RLC and MAC entities) being discussed.

Model 200 L2 Handling During Cell Change

Figure 4:
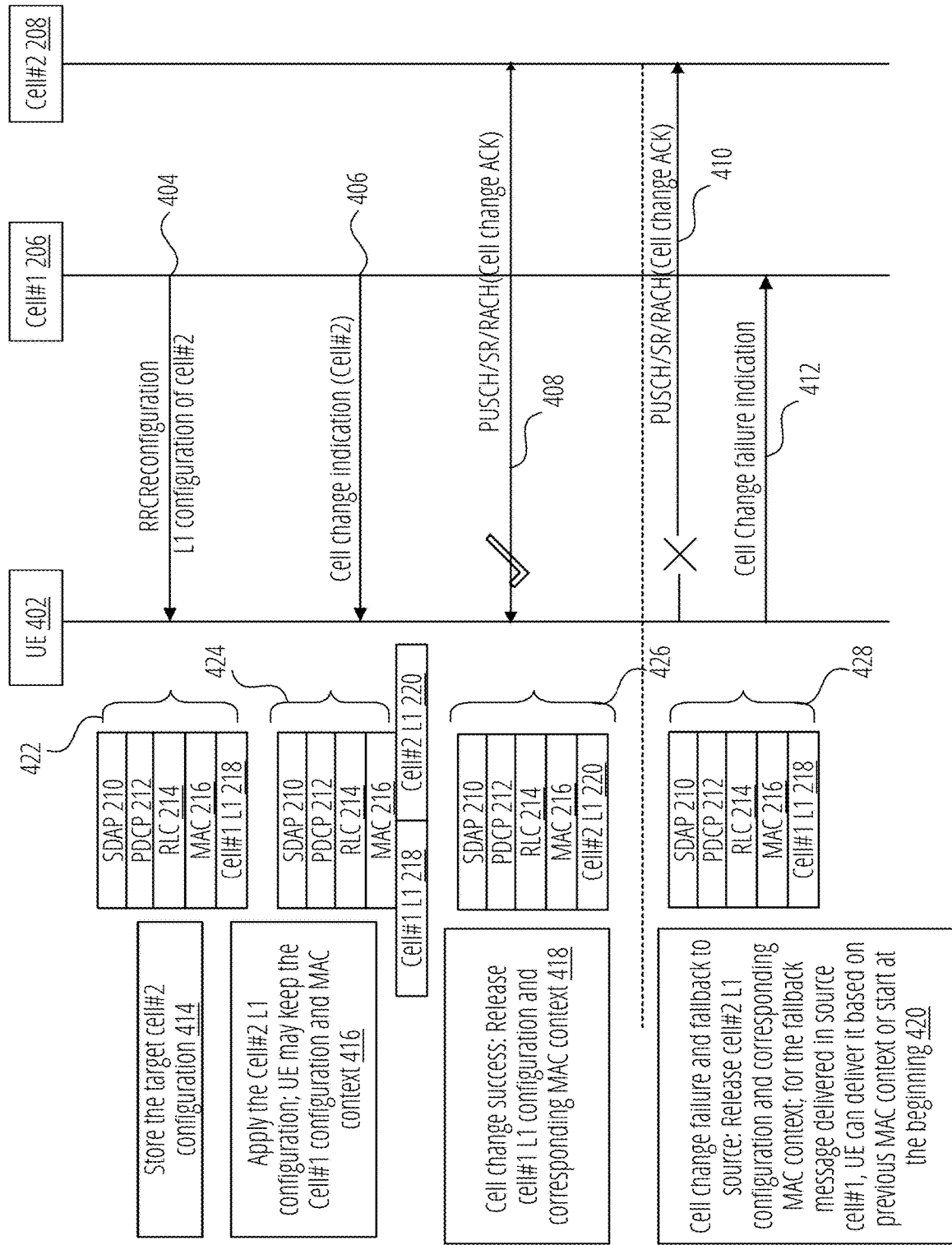
FIG. 4 illustrates an L1/L2-centric data flowchart during performance of a cell change in accordance with one embodiment.

FIG. 4 illustrates an L1/L2-centric data flowchart during performance of a cell change with respect to the model 200), with an illustration of each L1/L2 entity potentially involved in such communication (i.e., as shown by the blocks of L1/L2 entities to the left of each potential communication within the flowchart, each grouping of which is associated with a bracket in the form of bracket 422, bracket 424, bracket 426, and bracket 428). As shown, FIG. 4 includes a UE 402, the Cell#1 206, and the Cell#2 208. When the UE 402 is in connected mode with the Cell#1 206 (i.e., the serving/source cell), the NW may provide an L1 configuration of the Cell#2 208 (i.e., the target cell#2) for handover purposes, as represented by arrow 404. Note that the NW can update the L2 part of such configuration during the handover, but doing so may not lead to an L2 reset. In addition, the UE 402 may store the configuration information associated with the target cell (i.e., Cell#2 208) until it is to be used (e.g., upon receiving a cell change indication from the serving cell), as represented by block 414. Note the actions represented by arrow 404 and block 414 may also be associated with the entities of bracket 422.

At some point, the Cell#1 206 may then send a cell change indication to the UE 402 regarding a change to Cell#2 208 (i.e., the target cell), as represented by arrow 406. Upon receiving the cell change indication, the UE 402 may apply the Cell#2 208 L1 configuration and keep the Cell#1 206 configuration and MAC context, as represented by block 416. Note the actions represented by arrow 406 and block 416 may also be associated with the entities of bracket 424.

The UE 402 and the Cell#2 208 may then attempt to communicate via PUSCH, SR, and/or RACH procedure to complete the cell change procedure, as represented by arrow 408 and arrow 410. When successful (as represented by arrow 408), the UE 402 may release the Cell#1 206 L1 configuration and corresponding MAC context, as represented by block 418. Note the actions represented by arrow 408 and block 418 may also be associated with the entities of bracket 426.

Alternatively, when communication between the UE 402 and the Cell#2 208 regarding a cell change fails (as represented by arrow 410), may fallback to the source cell (i.e., the Cell#1 206). In particular, the UE 402 may release the Cell#2 208 L1 configuration and corresponding MAC context, and send a cell change failure indication to the Cell#1 206 (as represented by arrow 412). The UE 402 may deliver such cell change failure indication based on the previous MAC context (assuming the UE 402 still has the MAC context) or the UE 402 can start from the beginning to reconnect to the previous source cell (i.e., the Cell#1 206), as represented by block 420. Note the actions represented by arrow 410, arrow 412, and block 420 may also be associated with the entities of bracket 428.

Notably, when performing the L1/L2-centric cell change (which may be triggered by the L1 indication): 1. The UE may apply the target cell's L1 configuration for data transmission/reception; 2. The UE does not have to reestablish/reset the SDAP, PDCP, and/or RLC entities (i.e., there may be no impact on these L2 sublayers); 3. New behavior may be introduced in the MAC layer (e.g., the UE may reset some MAC functionalities from the beginning, but continue other MAC functionalities such as inheriting the context); and 4. During the cell change period, the UE may receive the DL transmission from both the source cell and the target cell at the same time.

Model 200 MAC Operation—Timing Advance (TA) Maintenance During Cell Change

In a first option, TATimer maintenance may be performed per cell. In such embodiments, the UE may maintain a TATimer and a TA value based on the serving/source cell. Before a cell change, the UE may maintain the TA in the serving/source cell, while after the cell change, the UE may reset the TA value and restart the TATimer in the target cell.

In embodiments under the first option where the UE receives the target cell's TA via the source cell or derives the target TA based on the source TA and a DL timing difference, the UE may start the TATimer for the target cell using one of two possibilities: a. Start the TATimer when receiving the target cell's TA; or b. Start the TATimer when delivering a first UL transmission to the target cell. Alternatively, in embodiments under the first option where the UE calculates the target cell's TA by itself, the UE may start the TATimer upon the first UL transmission.

In a second option, the TATimer maintenance may be performed across cells (i.e., the source cell and target cell are effectively in the same timing advance group (TAG)). Accordingly, in such embodiments, TATimer and TA value maintenance are common for source and target cell. In addition, when the UE performs a cell change, there may be no impact on the TATimer operation.

Furthermore, with respect to a TA for the first UL transmission to the target cell: 1. If the first UL comprises a RACH preamble transmission, the UE may set TA=0 and base the value on a DL communication timing of the target cell; or 2. If the first UL comprises an SR, a PUCCH, or a PUSCH transmission: a. When the NW does not provide the TA value in advance, the UE may use TA=0, reuse the source cell TA, or derive the TA based on the source TA and a DL timing difference for the first transmission; or b. The UE may apply the indicated TA value, which can be delivered via the source cell or target cell, based on a target DL timing for the transmission.

Model 200 MAC Operation—Power Headroom Reporting (PHR) During Cell Change

In a first option regarding PHR reporting, the UE may report the PH of a current serving cell and target cell(s) to the NW. The NW can use the target cell's (or target cells') PH information to perform UL power scheduling for the UL transmission in a neighbor cell directly, which may be particularly beneficial for fast inter-cell data transmission.

PHR trigger events under the first option may include, based on legacy events, when the target cell set for PH reporting is changed. The target cell set for PHR reporting may include all the configured target cells by RRC or indicated by L1/L2 signaling.

Figure 5:
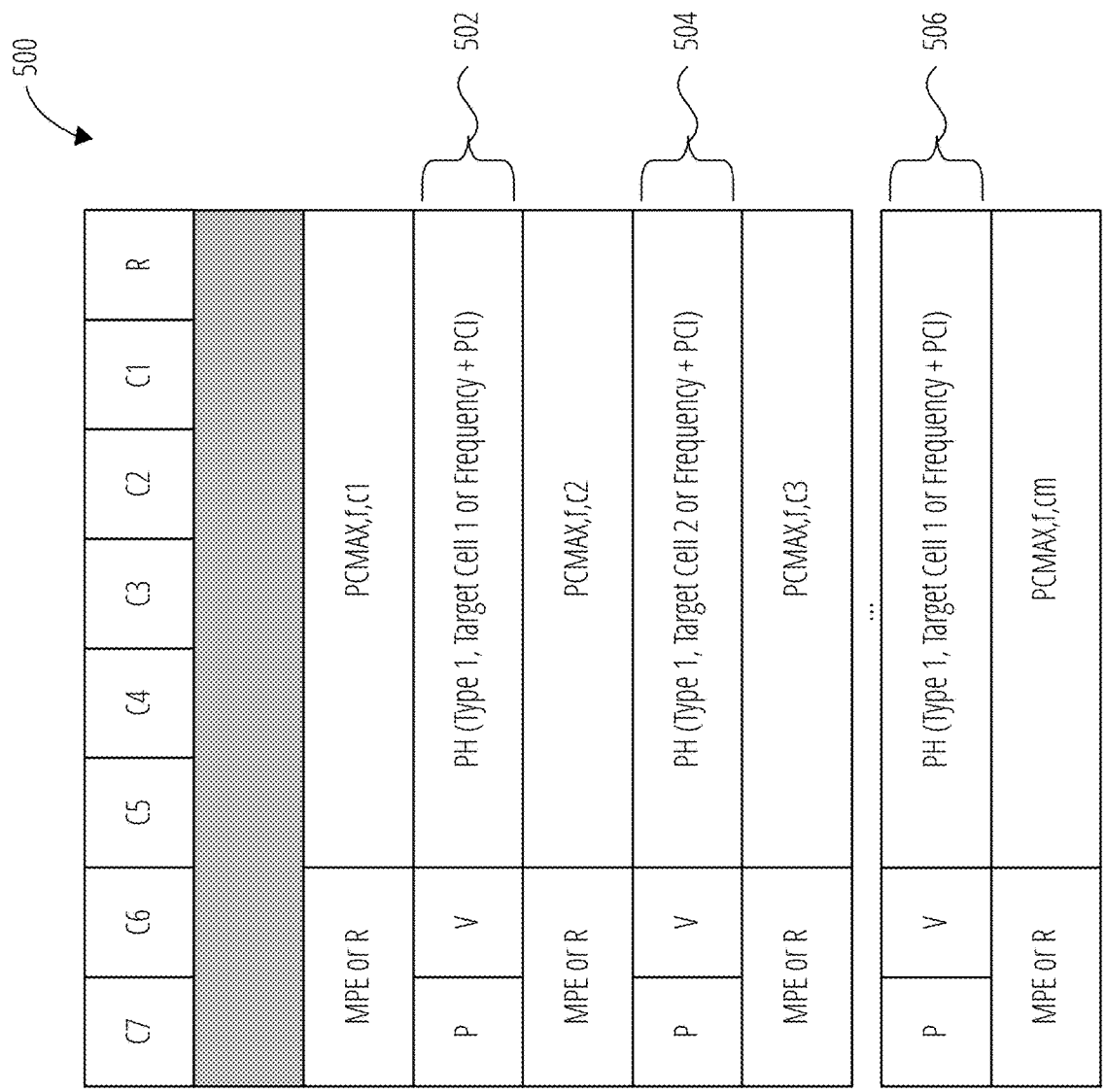
FIG. 5 illustrates a MAC CE in accordance with one embodiment.
Figure 6:
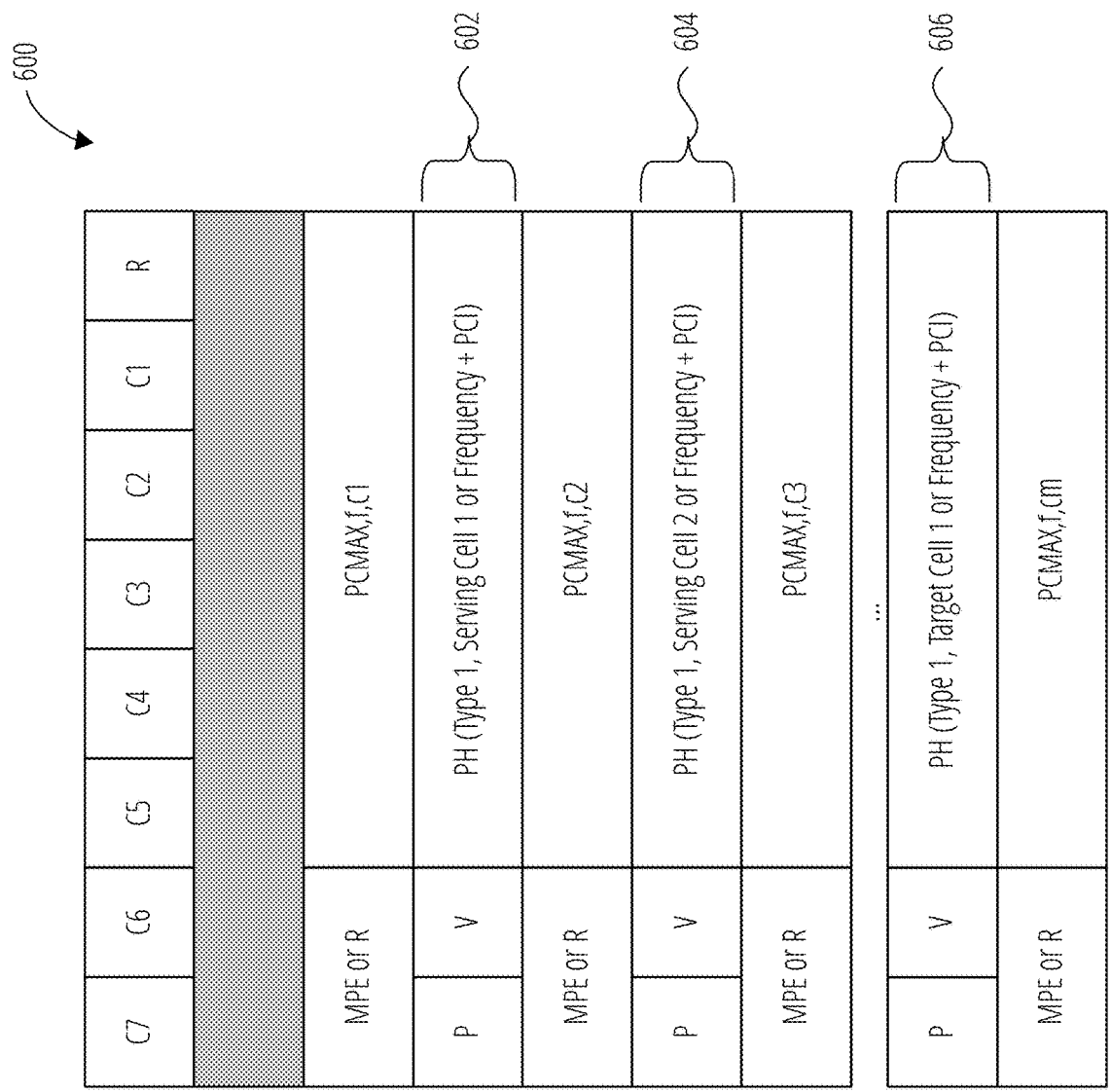
FIG. 6 illustrates a MAC CE in accordance with one embodiment.

PH reporting under the first option above may include a new PHR MAC control element (CE) being introduced for the target cell set PH reporting. In addition, PHR under for the first option above may include two additional possibilities as follows: a. The UE may report the PH for serving cell and target cell set separately in a different PHR MAC CE. In such embodiments, the new MAC CE (i.e., the MAC CE 500 of FIG. 5) for the target cell set PH reporting may be reported as shown in FIG. 5. As illustrated FIG. 5 includes a first new MAC CE 500 having PH levels for various target cells, as represented by the rows with bracket 502, bracket 504, and bracket 506; or b. The UE may report the PH for serving cell and target cell set in the same PHR MAC CE (i.e., the second new MAC CE of FIG. 6). As illustrated in FIG. 6, the second new MAC CE 600 includes both the serving cell and target cell set PH reporting, as further shown in the rows represented by bracket 602, bracket 604, and bracket 606.

PH value determinations under the first option above may include the UE reporting a virtual PH for the target cell set. The power control parameters to derive the PH value is determined by either: a. Configuring by RRC; or b. The power control parameters associated with a transmission configuration indicator (TCI) for the target cell. The UE may identify the target cell in the MAC CE via the target cell index or physical cell ID (PCI)+Frequency index.

In a second option regarding PHR reporting, the UE may report a PH value of the current serving cell to the NW (which action may be similar to legacy behaviors).

Regarding UL power for a first UL transmission to the target cell, two options may be utilized, including: 1. The NW may provide a transmission power control (TPC) for the first UL transmission in target cell together with the cell change indication. The UE may then calculate the power based on the TPC and the target cell's power control parameter and pathloss; 2. The UE may perform the UL transmission based on the target cell's power control parameter and pathloss.

Model 200 MAC Operation—Buffer Status Report (BSR) During Cell Change

In a first option regarding BSR, the UE may trigger the BSR in a target cell when available data has arrived in the UE uplink buffer. Under the first option, two additional options may be utilized as follows: a. The UE may cancel a pending BSR in the source cell, and trigger a BSR in target cell upon the available data arrival for target cell transmission. In a slight modification, an RRC parameter can be introduced to configure whether the UE is to cancel a pending BSR in the source cell; or b. The UE may trigger a BSR in the target cell if there is a pending BSR in the source cell. In a slight modification, an RRC parameter can be introduced to configure whether the UE is to trigger a BSR in the target cell.

In a second option regarding BSR, there may be no impact on the BSR mechanism. In such case, a cell change may be transparent to the BSR procedure.

Model 200 MAC Operation—Beam Failure Recovery (BFR) During Cell Change

The BFR procedure under the model 200 may include three main options: 1. The BFR procedure may be performed per serving cell, in accordance with legacy procedures; 2. The BFR procedure may be performed separately for source cells and target cells, in accordance with legacy procedures; or 3. The BFR procedure may performed across the source cell and target cell, which includes various additional options, including: a. Upon BFD detection in a current serving cell, if the UE detects a candidate beam in a target cell, the UE may switch to the target cell and use the detected candidate beam for data transmission and reception, which may include: i. The UE performing the cell change to the target cell using the candidate beam directly; or ii. The UE performing the BFR-SR/RACH and BFR MAC CE in the current serving cell, and after a BFR MAC CE transmission success, the UE switching to the target cell; b. Upon BFD detection in the current serving cell, if the UE detects a candidate beam in the current serving cell, the UE may perform BFR in the current serving cell; c. During the BFR procedure (i.e., the preamble/BFR-SR or BFR MAC CE has been transmitted but is not complete), if the UE receives a cell change indication or a cell change condition is fulfilled, the UE may terminate the ongoing BFR procedure, and switch to the target cell; or d. When the UE switches to the target cell, the UE may reset the BFD/BFR variables and start the BFD procedure from the very beginning.

Model 200 MAC Operation—Hybrid Automatic Repeat Request (HARQ) During Cell Change HARQ entities under the model 200 may include three options. In a first option, the HARQ entities may be separate for the source cell and the target cell. In such embodiments, the UE can perform data reception/transmission on both the source and the target cell simultaneously during a cell change. After the UE switches to the target cell, the UE can stop/reset/suspend the HARQ entities for the source cell transmission. Notably, the HARQ process in such embodiments may not be shared between the source and the target cell. In addition, HARQ retransmission across the source and the target cell may not be supported in such embodiments.

In a second option, HARQ entities may be shared by the source and the target cell. In such embodiments, the UE can perform data transmission and/or reception on the source and the target cell simultaneously. In addition, the HARQ process may be shared across multiple cells and HARQ retransmission across cells is supported, in such embodiments.

In a third option, HARQ entities may be shared by the source and the target cell. In such embodiments, after the UE switches to a target cell, the UE may reset the new data indicator (NDI) and other HARQ context, and may start data transmission in the target cell from the beginning.

Model 200 MAC Operation—Configured Grant (CG)/Semi-Persistent Scheduling (SPS) During Cell Change With respect to source cell CG/SPS handling, the UE may clear or suspend the CG/SPS when starting a cell change procedure or upon cell change procedure completion success.

With respect to target cell CG/SPS handling, multiple options may be utilized, including: 1. When the UE switches to the target cell successfully, the NW may enable/activate the CG/SPS configuration by L1 downlink control information (DCI); 2. The NW may enable the CG/SPS in the target cell together with a cell change indication; or 3. The NW may indicate to use the source cell's CG/SPS resource in the target cell and indicate the TCI state used in the target cell in the cell change indication.

Model 200 MAC Operation—Discontinuous Reception (DRX) During Cell Change

In a first option, DRX may be per serving cell (as in legacy procedures). In such embodiments when the UE switches to a target cell, the UE may reset the DRX variable, and run the DRX mechanism in the target cell from the beginning.

In a second option, DRX may be across serving cells. In such embodiments, the DRX mechanism may be maintained according to data scheduling and data activity on both the source cell and the target cell. In addition, when the UE performs cell switching, the UE may maintain a DRX-ON state to finish a first UL transmission. The UE may then start the DRX timer according to the first SR/PUCCH/PUSCH transmission.

Model 300—Separate RLC and MAC Entities

Figure 7:
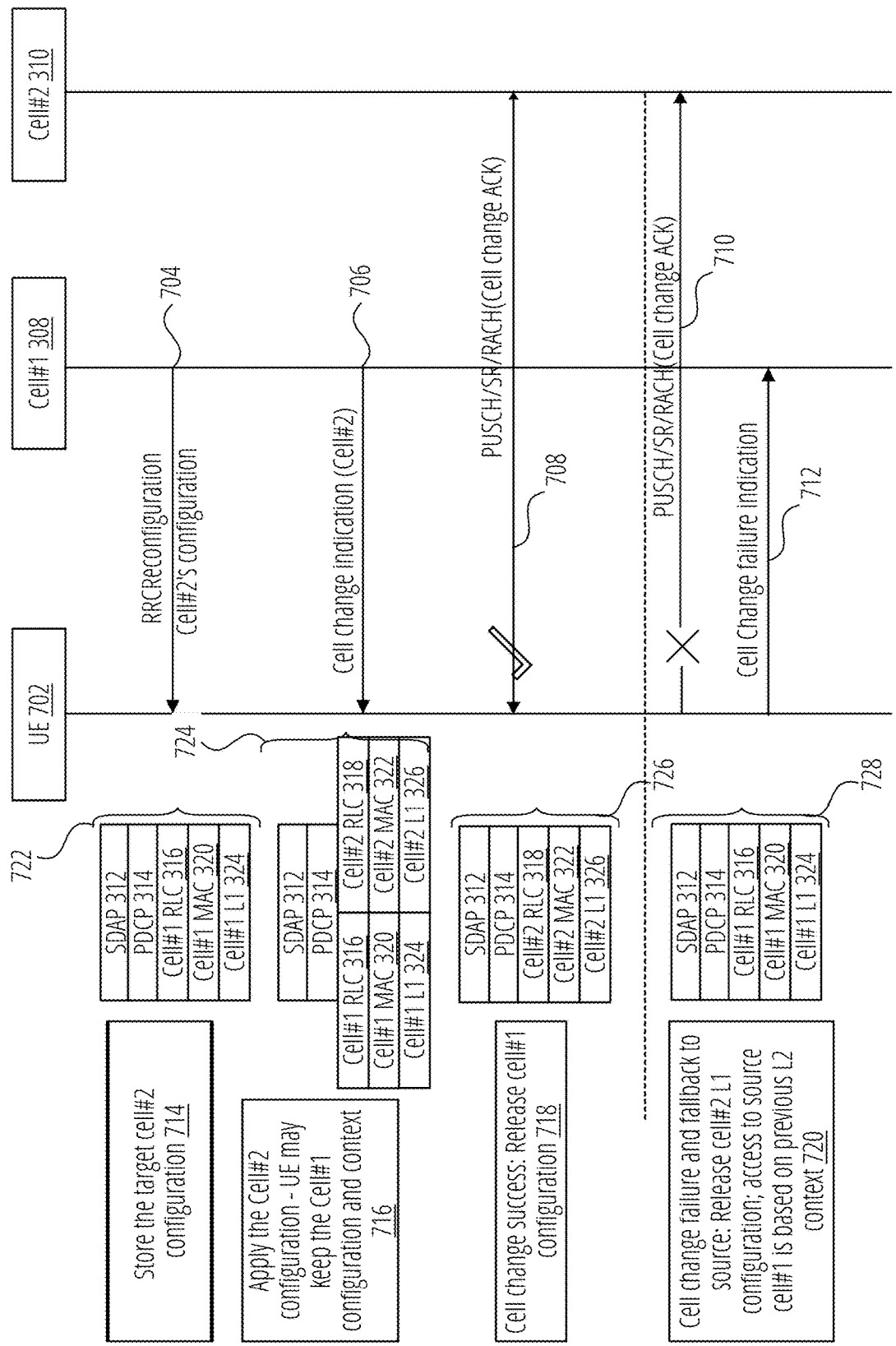
FIG. 7 illustrates an L1/L2-centric data flowchart during performance of a cell change in accordance with one embodiment.

FIG. 7 illustrates an L1/L2-centric data flowchart during performance of a cell change with respect to the model 300, with an illustration of each L1/L2 entity potentially involved in such communication (i.e., as shown by the blocks of L1/L2 entities to the left of each potential communication within the flowchart, each grouping of which is associated with a bracket in the form of bracket 722, bracket 724, bracket 726, and bracket 728). As shown, FIG. 7 includes a UE 702, the Cell#1 308, and the Cell#2 310. When the UE 702 is in connected mode with the Cell#1 308 (i.e., the serving/source cell), the NW may provide a configuration of the Cell#2 310 (i.e., the target cell#2) for handover purposes, as represented by arrow 704. In addition, the UE 702 may store the configuration information associated with the target cell (i.e., Cell#2 310) until it is to be used (e.g., upon receiving a cell change indication from the serving/source cell), as represented by block 714. Note the actions represented by arrow 704 and block 714 may also be associated with the entities of bracket 722.

At some point, the Cell#1 308 may then send a cell change indication to the UE 702 regarding a change to Cell#2 310 (i.e., the target cell), as represented by arrow 706. Upon receiving the cell change indication, the UE 702 may apply the Cell#2 310 configuration and keep the Cell#1 308 configuration and context, as represented by block 716. Note the actions represented by arrow 706 and block 716 may also be associated with the entities of bracket 724.

The UE 702 and the Cell#2 310 may then attempt to communicate via PUSCH, SR, and/or RACH procedure to complete the cell change procedure, as represented by arrow 708 and arrow 710. When successful (as represented by arrow 708), the UE 702 may release the Cell#1 308 configuration, as represented by block 718. Note the actions represented by arrow 708 and block 718 may also be associated with the entities of bracket 726.

Alternatively, when communication between the UE 702 and the Cell#2 310 regarding a cell change fails (as represented by arrow 710), may fallback to the source/serving cell (i.e., the Cell#1 308). In particular, the UE 702 may release the Cell#2 310 L1 configuration, and send a cell change failure indication to the Cell#1 308 (as represented by arrow 712). The UE 702 may deliver such cell change failure indication based on the previous L2 context, as represented by block 720. Note the actions represented by arrow 710, arrow 712, and block 720 may also be associated with the entities of bracket 728.

Notably, when performing the L1/L2-centric cell change (which may be triggered by an L1 indication), L2 handling may include: 1. The UE may reset the MAC/RLC entities, and perform PDCP reestablishment/recovery based on the NW indication; 2. The UE may apply the target cell's configuration for data transmission/reception; 3. The UE may release the source cell configuration upon cell change success; 4. The UE may release the target cell configuration upon cell change failure; and 5. During the cell change period, the UE may receive a DL transmission from both the source cell and the target cell at the same time.

Figure 8:
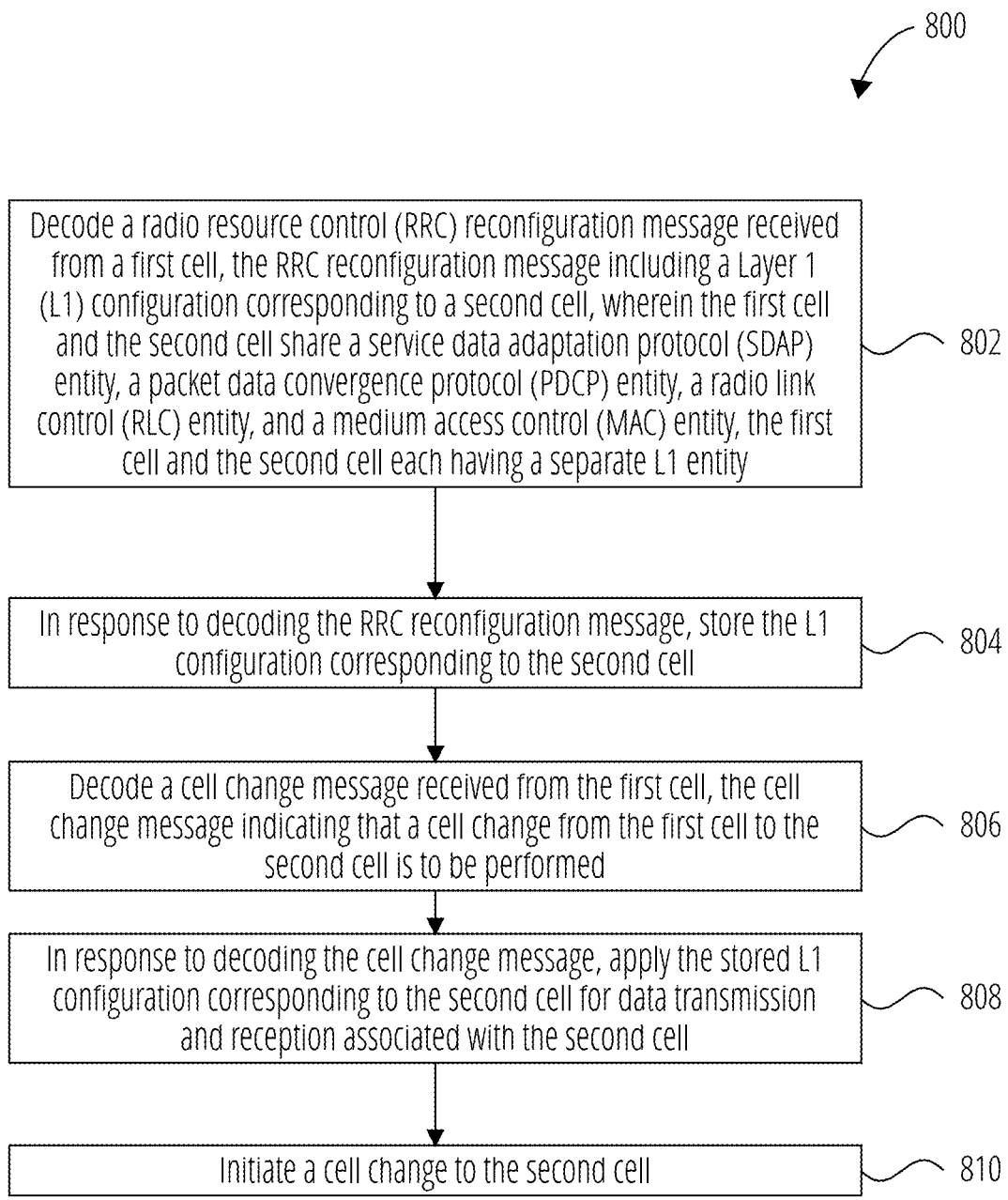
FIG. 8 illustrates a flowchart of a method for L2 handling during a cell change procedure in accordance with one embodiment.

FIG. 8 illustrates a flowchart of a method 800 for L2 handling during a cell change procedure. In block 802, the method 800 decodes a radio resource control (RRC) reconfiguration message received from a first cell. For instance, the first cell may comprise a current source/serving cell. The RRC reconfiguration message may include a Layer 1 (L1) configuration corresponding to a second cell. For example, the second cell may comprise a potential target cell.

The first cell and the second cell may share a service data adaptation protocol (SDAP) entity, a packet data convergence protocol (PDCP) entity, a radio link control (RLC) entity, and a medium access control (MAC) entity. In addition, the first cell and the second cell may each have a separate L1 entity. In an example, the first cell and the second cell may utilize the model 200.

In block 804, the method 800, in response to decoding the RRC reconfiguration message, stores the L1 configuration corresponding to the second cell. For example, the UE may store a configuration associated with a potential target cell (i.e., the second cell) for a later cell change. In block 806, the method 800 decodes a cell change message received from the first cell. The cell change message may indicate that a cell change from the first cell to the second cell is to be performed. For instance, the source/serving cell may transmit a cell change indication to the UE regarding a target cell.

In block 808, the method 800, in response to decoding the cell change message, applies the stored L1 configuration corresponding to the second cell for data transmission and reception associated with the second cell. For instance, the UE may apply a stored configuration corresponding to a target cell received previously in anticipation of a potential cell change to the target cell. In block 810, method 800 initiates a cell change to the second cell. For instance, the UE may send an acknowledgement message to the target cell to initiate a cell change procedure.

The method 800 may further include storing a configuration and a MAC context corresponding to the first cell until determining that changing cells to the second cell is successful. The method 800 may further include the UE not resetting the SDAP entity, the PDCP entity, the RLC entity, or the MAC entity based on the first cell and the second cell sharing the SDAP entity, the PDCP entity, the RLC entity, and the MAC entity.

The method 800 may further include determining that changing cells to the second cell has failed and performing a fallback to the first cell. Performing the fallback may include releasing the L1 configuration corresponding to the second cell and a MAC context corresponding to the second cell, and encoding a fallback message for transmission to the first cell. Transmitting the fallback message may be performed using a stored configuration and MAC context corresponding to the first cell.

The method 800 further include performing timing advance timer (TATimer) maintenance per cell. TATimer maintenance may include maintaining a timing advance (TA) value and a TATimer corresponding to the first cell prior to changing cells, and resetting the TA value and restarting the TATimer with respect to the second cell after changing cells. The UE may start the TATimer upon receiving a TA value corresponding to the second cell or start the TATimer when transmitting a first UL to the second cell.

The method 800 may further include reporting power headroom (PH) corresponding to the first cell and PH corresponding to the second cell to a network associated with the first cell and the second cell. The method 800 may further include reporting the PH corresponding to the first cell in a first PH reporting (PHR) MAC control element (CE) and the PH corresponding to the second cell in a second PHR MAC CE, or reporting the PH corresponding to the first cell and the PH corresponding to the second cell in a same PHR MAC CE.

The method 800 may further include triggering a buffer status report (BSR) upon available data arriving in an uplink buffer of the UE. The method 800 may further include the UE cancelling a pending BSR in the first cell and triggering a new BSR in the second cell when the available data arrives for transmission to the second cell. The method 800 may further include the UE triggering the BSR in the target cell when there is a pending BSR in the first cell.

The method 800 may further include performing a beam failure recovery (BFR) across the first cell and the second cell. The method 800 may also include detecting a beam failure in the first cell, detecting a candidate beam in the second cell, and based on detecting the candidate beam in the second cell, both switching to the second cell and encoding communications for the second cell using the detected candidate beam.

The method 800 may further include performing data transmission and reception for both the first cell and the second cell simultaneously during the cell change when utilizing a separate hybrid automatic repeat request (HARQ) entity for the first cell and the second cell. The method 800 may further include clearing a configured grant (CG) and a semi-persistent scheduling (SPS) at the first cell when initiating the cell change to the second cell.

The method 800 may include, upon receiving the cell change indication, enabling a configured grant (CG) and a semi-persistent scheduling (SPS) at the second cell. The method 800 may also include maintaining a discontinuous reception (DRX) variable according to data scheduling and data activity at both the first cell and the second cell.

Figure 9:
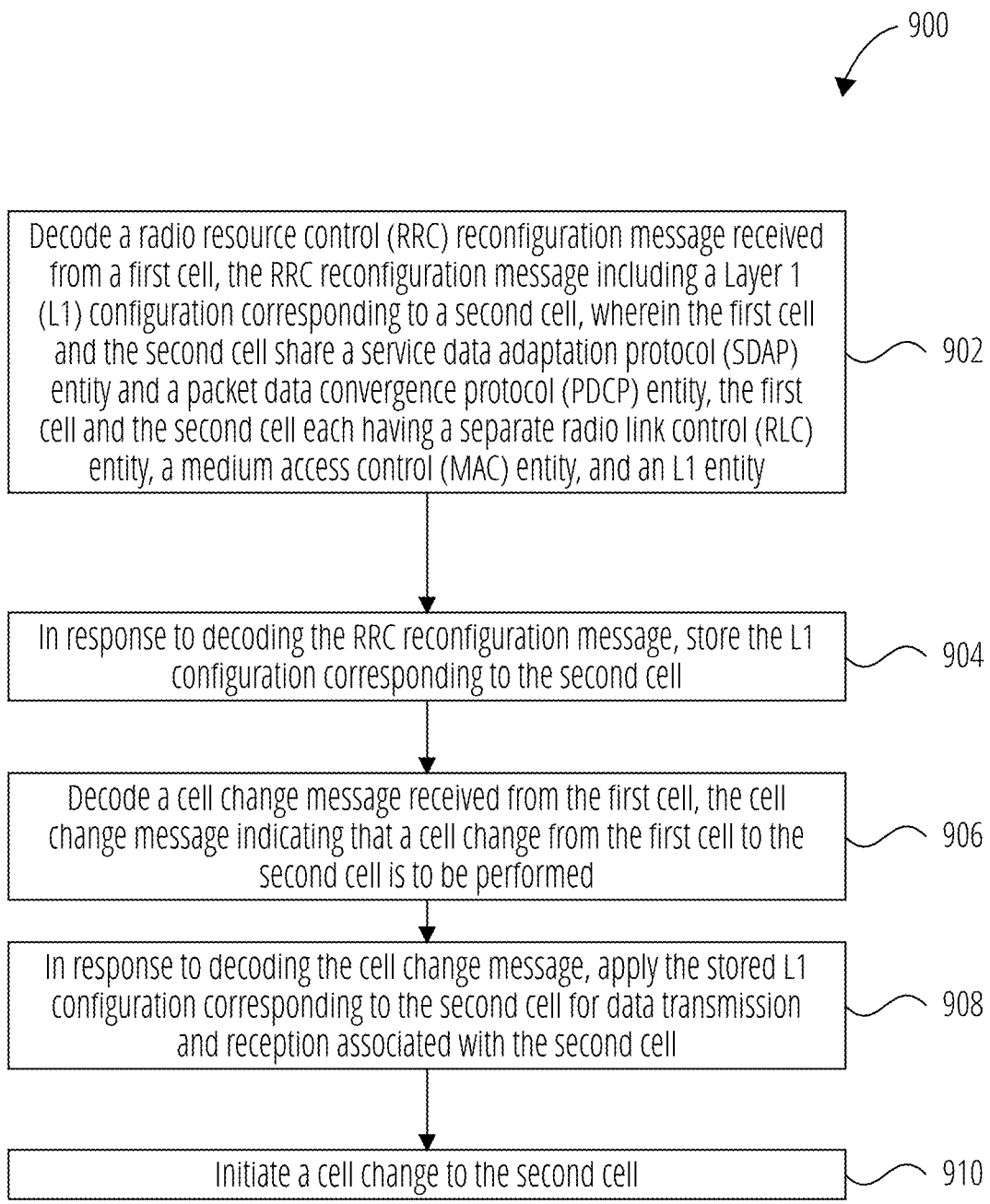
FIG. 9 illustrates a flowchart of a method for L2 handling during a cell change procedure in accordance with one embodiment.

FIG. 9 illustrates a flowchart of a method 900 for L2 handling during a cell change procedure. In block 902, the method 900 decodes a radio resource control (RRC) reconfiguration message received from a first cell. For instance, the first cell may comprise a current source/serving cell. The RRC reconfiguration message may include a Layer 1 (L1) configuration corresponding to a second cell. For example, the second cell may comprise a potential target cell.

The first cell and the second cell may share a service data adaptation protocol (SDAP) entity and a packet data convergence protocol (PDCP) entity. In addition, the first cell and the second cell may each have a separate radio link control (RLC) entity, a medium access control (MAC) entity, and an L1 entity. In an example, the first cell and the second cell may utilize the model 300.

In block 904, the method 900, in response to decoding the RRC reconfiguration message, stores the L1 configuration corresponding to the second cell. For example, the UE may store a configuration associated with a potential target cell (i.e., the second cell) for a later cell change. In block 906, the method 900 decodes a cell change message received from the first cell. The cell change message may indicate that a cell change from the first cell to the second cell is to be performed. For instance, the source/serving cell may transmit a cell change indication to the UE regarding a target cell.

In block 908, the method 900, in response to decoding the cell change message, applies the stored L1 configuration corresponding to the second cell for data transmission and reception associated with the second cell. For instance, the UE may apply a stored configuration corresponding to a target cell received previously in anticipation of a potential cell change to the target cell. In block 910, the method 900 initiates a cell change to the second cell. For instance, the UE may send an acknowledgement message to the target cell to initiate a cell change procedure.

The method 900 may further include, upon changing cells to the second cell, resetting the RLC entity and the MAC entity and performing PDCP recovery based on an indication from a network associated with the first cell and the second cell. The method 900 may also include storing a configuration and a context corresponding to the first cell until determining that changing cells to the second cell is successful. The method 900 may also include determining that changing cells to the second cell has failed and performing a fallback to the first cell. Performing the fallback to the first cell may include releasing the L1 configuration corresponding to the second cell and encoding a fallback message for transmission to the first cell. Transmitting the fallback message may be performed using a stored context corresponding to the first cell.

Figure 10:
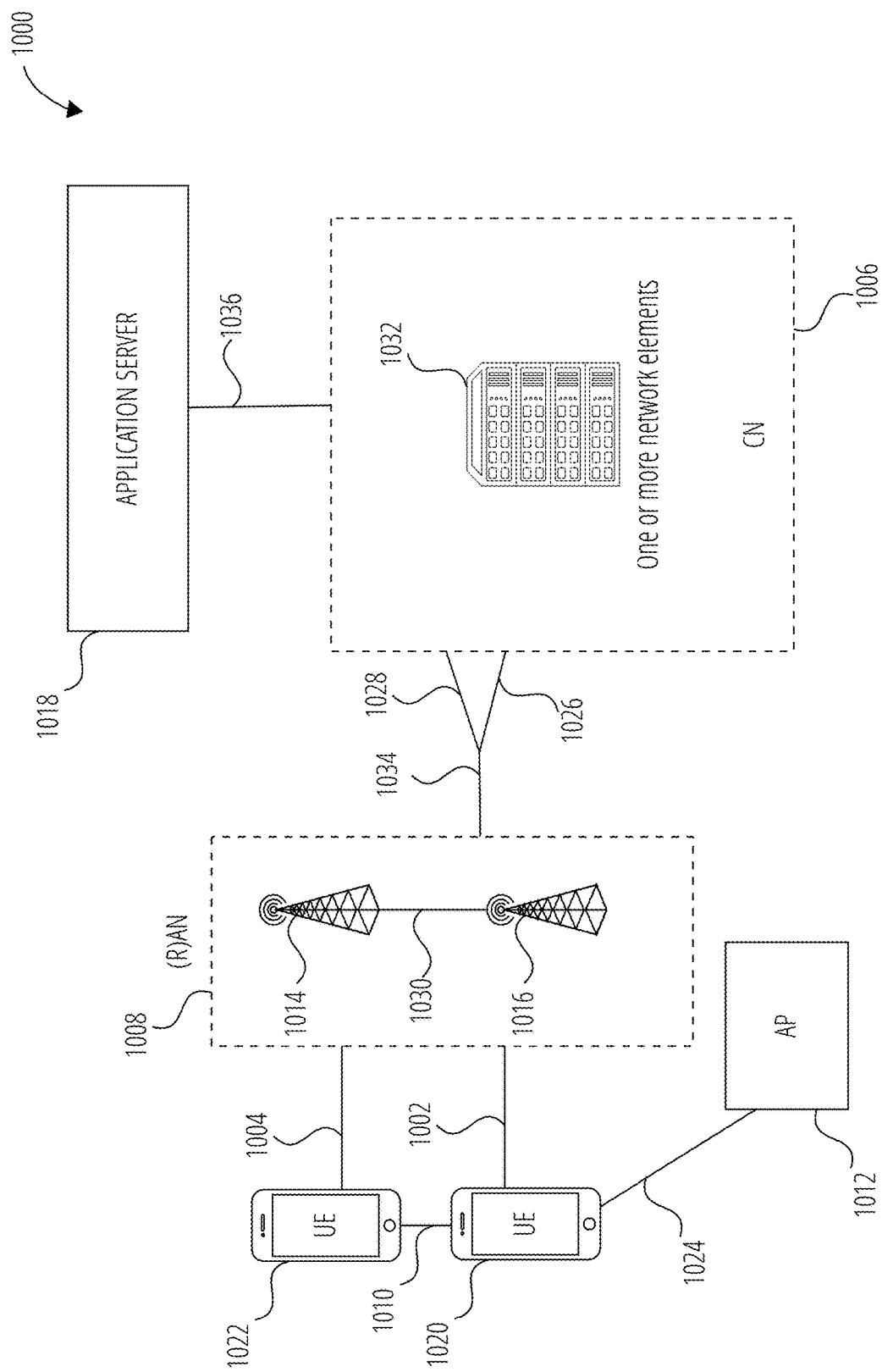
FIG. 10 illustrates a system in accordance with one embodiment.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1022 and UE 1020. In this example, the UE 1022 and the UE 1020 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1022 and/or the UE 1020 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1022 and UE 1020 may be configured to connect, for example, communicatively couple, with an access node or radio access node (shown as (R)AN 1008). In embodiments, the (R)AN 1008 may be an NG RAN or a SG RAN, an E-UTRAN, or a legacy RAN, such as a UTRAN or GERAN. As used herein, the term "NG RAN" or the like may refer to a (R)AN 1008 that operates in an NR or SG system, and the term "E-UTRAN" or the like may refer to a (R)AN 1008 that operates in an LTE or 4G system. The UE 1022 and UE 1020 utilize connections (or channels) (shown as connection 1004 and connection 1002, respectively), each of which comprises a physical communications interface or layer (discussed in further detail below).

In this example, the connection 1004 and connection 1002 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 1022 and UE 1020 may directly exchange communication data via a ProSe interface 1010. The ProSe interface 1010 may alternatively be referred to as a sidelink (SL) interface 110 and may comprise one or more logical channels, including but not limited to a PSCCH, a PSSCH, a PSDCH, and a PSBCH.

The UE 1020 is shown to be configured to access an AP 1012 (also referred to as "WLAN node," "WLAN," "WLAN Termination," "WT" or the like) via connection 1024. The connection 1024 can comprise a local wireless connection, such as a connection consistent with any IEEE 802.11 protocol, wherein the AP 1012 would comprise a wireless fidelity (Wi-Fi®) router. In this example, the AP 1012 may be connected to the Internet without connecting to the core network of the wireless system (described in further detail below). In various embodiments, the UE 1020, (R)AN 1008, and AP 1012 may be configured to utilize LWA operation and/or LWIP operation. The LWA operation may involve the UE 1020 in RRC_CONNECTED being configured by the RAN node 1014 or the RAN node 1016 to utilize radio resources of LTE and WLAN. LWIP operation may involve the UE 1020 using WLAN radio resources (e.g., connection 1024) via IPsec protocol tunneling to authenticate and encrypt packets (e.g., IP packets) sent over the connection 1024. IPsec tunneling may include encapsulating the entirety of original IP packets and adding a new packet header, thereby protecting the original header of the IP packets.

The (R)AN 1008 can include one or more AN nodes, such as RAN node 1014 and RAN node 1016, that enable the connection 1004 and connection 1002. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1000 (e.g., an eNB). According to various embodiments, the RAN node 1014 or RAN node 1016 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1014 or RAN node 1016 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1014 or RAN node 1016); a MAC/PHY split wherein RRC, PDCP, RLC, and MAC layers are operated by the CRAN/vBBUP and the PHY layer is operated by individual RAN nodes (e.g., RAN node 1014 or RAN node 1016); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1014 or RAN node 1016 to perform other virtualized applications. In some implementations, an individual RAN node may represent individual gNB-DUs that are connected to a gNB-CU via individual F1 interfaces (not shown by FIG. 10). In these implementations, the gNB-DUs may include one or more remote radio heads or RFEMs, and the gNB-CU may be operated by a server that is located in the (R)AN 1008 (not shown) or by a server pool in a similar manner as the CRAN/vBBUP. Additionally, or alternatively, one or more of the RAN node 1014 or RAN node 1016 may be next generation eNBs (ng-eNBs), which are RAN nodes that provide E-UTRA user plane and control plane protocol terminations toward the UE 1022 and UE 1020, and are connected to an SGC via an NG interface (discussed infra). In V2X scenarios one or more of the RAN node 1014 or RAN node 1016 may be or act as RSUs.

The RAN node 1014 and/or the RAN node 1016 can terminate the air interface protocol and can be the first point of contact for the UE 1022 and UE 1020. In some embodiments, the RAN node 1014 and/or the RAN node 1016 can fulfill various logical functions for the (R)AN 1008 including, but not limited to, radio network controller (RNC) functions such as radio bearer management, uplink and downlink dynamic radio resource management and data packet scheduling, and mobility management.

In embodiments, the UE 1022 and UE 1020 can be configured to communicate using OFDM communication signals with each other or with the RAN node 1014 and/or the RAN node 1016 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1014 and/or the RAN node 1016 to the UE 1022 and UE 1020, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1022 and UE 1020 and the RAN node 1014 and/or the RAN node 1016 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1022 and UE 1020 and the RAN node 1014 or RAN node 1016 may operate using LAA, eLAA, and/or feLAA mechanisms. In these implementations, the UE 1022 and UE 1020 and the RAN node 1014 or RAN node 1016 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1022 and UE 1020, RAN node 1014 or RAN node 1016, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1022, AP 1012, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The PDSCH carries user data and higher-layer signaling to the UE 1022 and UE 1020. The PDCCH carries information about the transport format and resource allocations related to the PDSCH channel, among other things. It may also inform the UE 1022 and UE 1020 about the transport format, resource allocation, and HARQ information related to the uplink shared channel. Typically, downlink scheduling (assigning control and shared channel resource blocks to the UE 1020 within a cell) may be performed at any of the RAN node 1014 or RAN node 1016 based on channel quality information fed back from any of the UE 1022 and UE 1020.

The downlink resource assignment information may be sent on the PDCCH used for (e.g., assigned to) each of the UE 1022 and UE 1020.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1014 or RAN node 1016 may be configured to communicate with one another via interface 1030. In embodiments where the system 1000 is an LTE system (e.g., when CN 1006 is an EPC), the interface 1030 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1022 from an SeNB for user data; information of PDCP PDUs that were not delivered to a UE 1022; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a 5G or NR system (e.g., when CN 1006 is an 5GC), the interface 1030 may be an Xn interface. The Xn interface is defined between two or more RAN nodes (e.g., two or more gNBs and the like) that connect to 5GC, between a RAN node 1014 (e.g., a gNB) connecting to 5GC and an eNB, and/or between two eNBs connecting to 5GC (e.g., CN 1006). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1022 in a connected mode (e.g., CM-CONNECTED) including functionality to manage the UE mobility for connected mode between one or more RAN node 1014 or RAN node 1016. The mobility support may include context transfer from an old (source) serving RAN node 1014 to new (target) serving RAN node 1016; and control of user plane tunnels between old (source) serving RAN node 1014 to new (target) serving RAN node 1016. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1008 is shown to be communicatively coupled to a core network—in this embodiment, CN 1006. The CN 1006 may comprise one or more network elements 1032, which are configured to offer various data and telecommunications services to customers/subscribers (e.g., users of UE 1022 and UE 1020) who are connected to the CN 1006 via the (R)AN 1008. The components of the CN 1006 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1006 may be referred to as a network slice, and a logical instantiation of a portion of the CN 1006 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1018 may be an element offering applications that use IP bearer resources with the core network (e.g., UMTS PS domain, LTE PS data services, etc.). The application server 1018 can also be configured to support one or more communication services (e.g., VoIP sessions, PTT sessions, group communication sessions, social networking services, etc.) for the UE 1022 and UE 1020 via the EPC. The application server 1018 may communicate with the CN 1006 through an IP communications interface 1036.

In embodiments, the CN 1006 may be an 5GC, and the (R)AN 116 may be connected with the CN 1006 via an NG interface 1034. In embodiments, the NG interface 1034 may be split into two parts, an NG user plane (NG-U) interface 1026, which carries traffic data between the RAN node 1014 or RAN node 1016 and a UPF, and the S1 control plane (NG-C) interface 1028, which is a signaling interface between the RAN node 1014 or RAN node 1016 and AMFs.

In embodiments, the CN 1006 may be a 5G CN, while in other embodiments, the CN 1006 may be an EPC). Where CN 1006 is an EPC, the (R)AN 116 may be connected with the CN 1006 via an S1 interface 1034. In embodiments, the S1 interface 1034 may be split into two parts, an S1 user plane (S1-U) interface 1026, which carries traffic data between the RAN node 1014 or RAN node 1016 and the S-GW, and the S1-MME interface 1028, which is a signaling interface between the RAN node 1014 or RAN node 1016 and MMEs.

Figure 11:
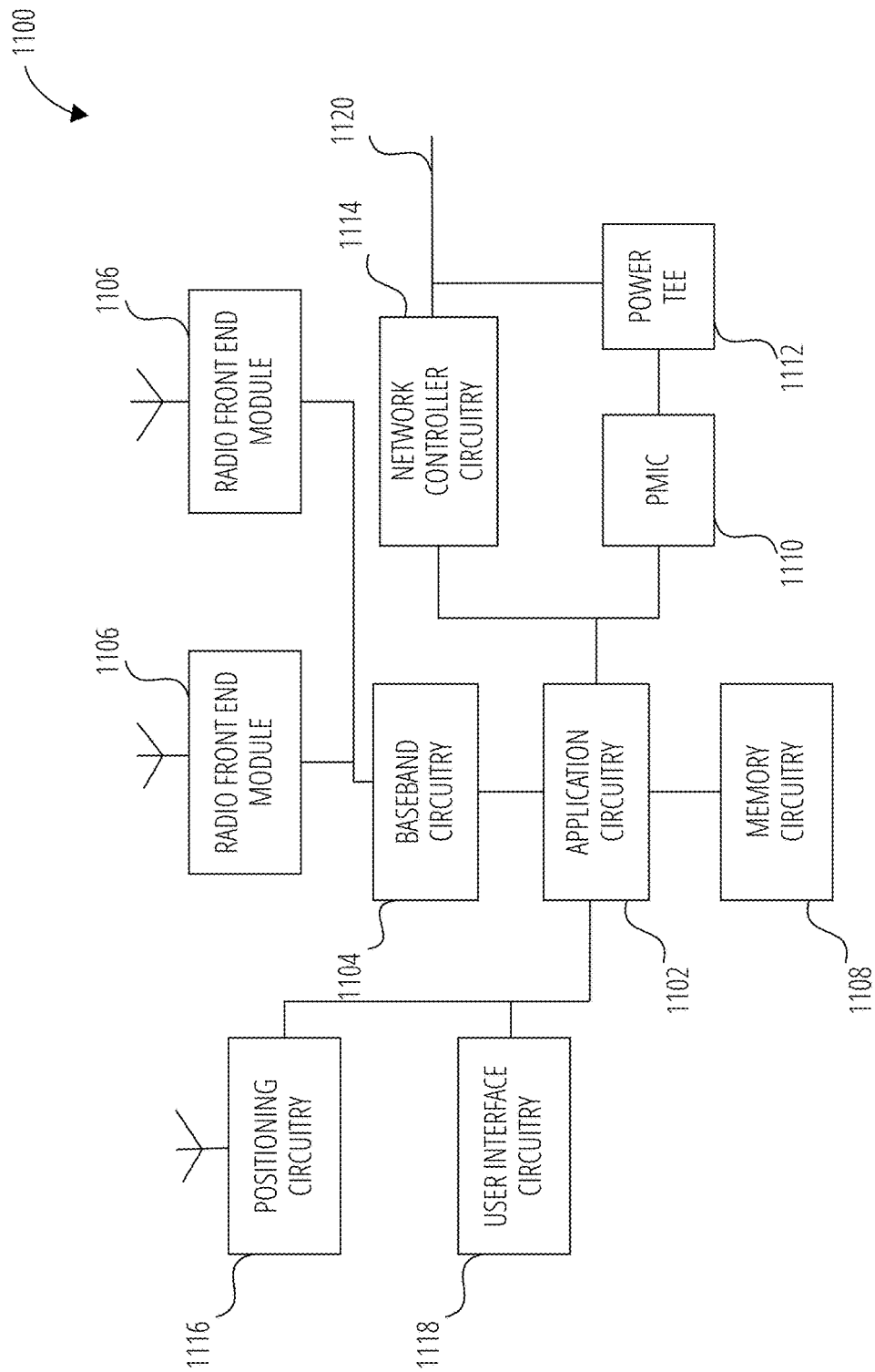
FIG. 11 illustrates an infrastructure equipment in accordance with one embodiment.

FIG. 11 illustrates an example of infrastructure equipment 1100 in accordance with various embodiments. The infrastructure equipment 1100 may be implemented as a base station, radio head, RAN node, AN, application server, and/or any other element/device discussed herein. In other examples, the infrastructure equipment 1100 could be implemented in or by a UE.

The infrastructure equipment 1100 includes application circuitry 1102, baseband circuitry 1104, one or more radio front end module 1106 (RFEM), memory circuitry 1108, power management integrated circuitry (shown as PMIC 1110), power tee circuitry 1112, network controller circuitry 1114, network interface connector 1120, satellite positioning circuitry 1116, and user interface circuitry 1118. In some embodiments, the device infrastructure equipment 1100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1102 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1102 may be coupled with or may include memory/storage elements and may be configured to execute instructions stored in the memory/storage to enable various applications or operating systems to run on the infrastructure equipment 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1102 may comprise, or may be, a special-purpose processor/controller to operate according to the various embodiments herein. As examples, the processor(s) of application circuitry 1102 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1100 may not utilize application circuitry 1102, and instead may include a special-purpose processor/controller to process IP data received from an EPC or 5GC, for example.

In some implementations, the application circuitry 1102 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1104 may be implemented, for example, as a solder-down substrate including one or more integrated circuits, a single packaged integrated circuit soldered to a main circuit board or a multi-chip module containing two or more integrated circuits.

The user interface circuitry 1118 may include one or more user interfaces designed to enable user interaction with the infrastructure equipment 1100 or peripheral component interfaces designed to enable peripheral component interaction with the infrastructure equipment 1100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D)cross-point (XPOINT) memories from Intel® and Micron®. The memory circuitry 1108 may be implemented as one or more of solder down packaged integrated circuits, socketed memory modules and plug-in memory cards.

The PMIC 1110 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1112 may provide for electrical power drawn from a network cable to provide both power supply and data connectivity to the infrastructure equipment 1100 using a single cable.

The network controller circuitry 1114 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1100 via network interface connector 1120 using a physical connection, which may be electrical (commonly referred to as a "copper interconnect"), optical, or wireless. The network controller circuitry 1114 may include one or more dedicated processors and/or FPGAs to communicate using one or more of the aforementioned protocols. In some implementations, the network controller circuitry 1114 may include multiple controllers to provide connectivity to other networks using the same or different protocols.

Figure 12:
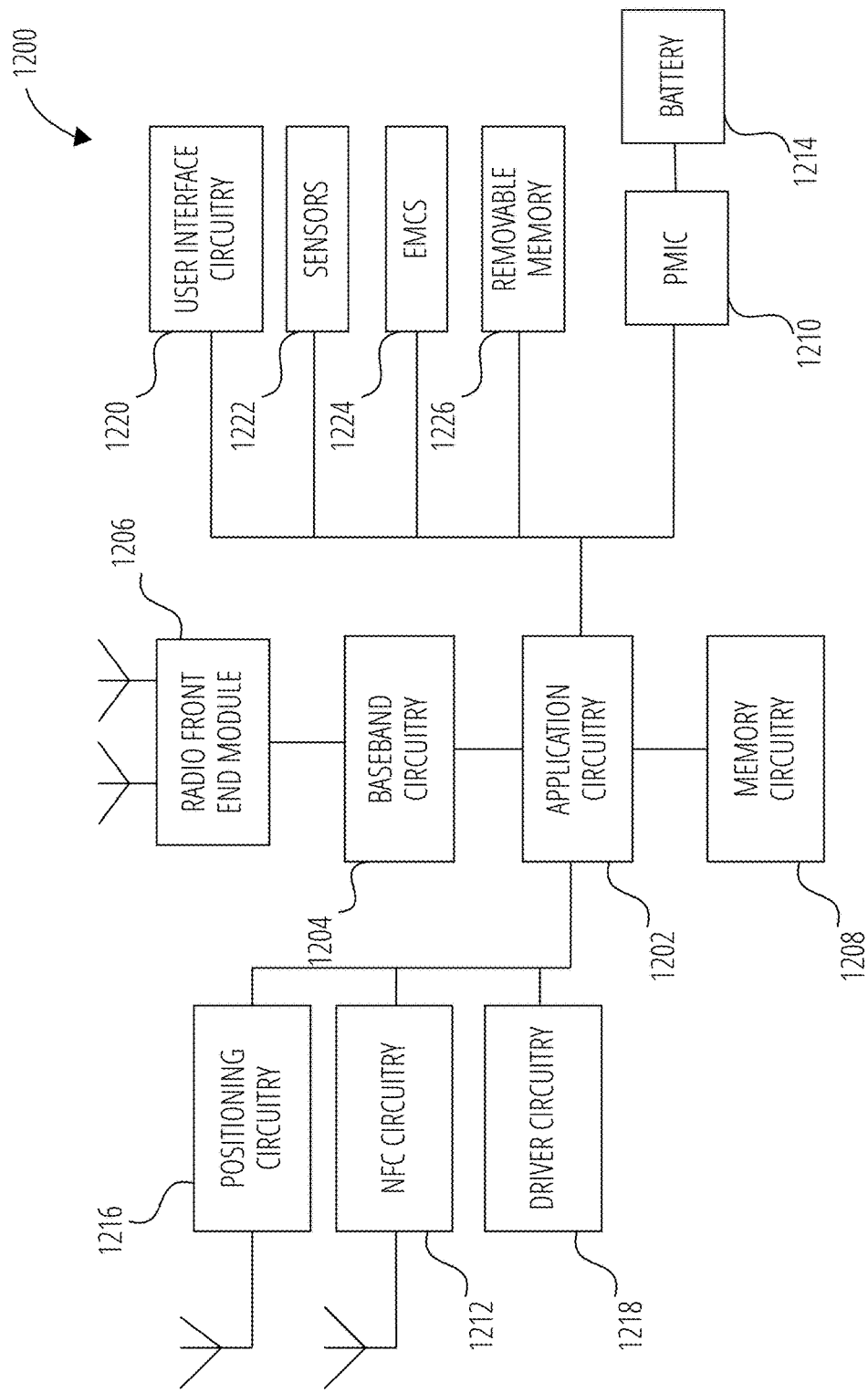
FIG. 12 illustrates a platform in accordance with one embodiment.

FIG. 12 illustrates an example of a platform 1200 in accordance with various embodiments. In embodiments, the computer platform 1200 may be suitable for use as UEs, application servers, and/or any other element/device discussed herein. The platform 1200 may include any combinations of the components shown in the example. The components of platform 1200 may be implemented as integrated circuits (ICs), portions thereof, discrete electronic devices, or other modules, logic, hardware, software, firmware, or a combination thereof adapted in the computer platform 1200, or as components otherwise incorporated within a chassis of a larger system. The block diagram of FIG. 12 is intended to show a high level view of components of the computer platform 1200. However, some of the components shown may be omitted, additional components may be present, and different arrangement of the components shown may occur in other implementations.

Application circuitry 1202 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1202 may be coupled with or may include memory/storage elements and may be configured to execute instructions stored in the memory/storage to enable various applications or operating systems to run on the platform 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1202 may comprise, or may be, a special-purpose processor/controller to operate according to the various embodiments herein.

As examples, the processor(s) of application circuitry 1202 may include an Intel® Architecture Core™ based processor, such as a Quark™, an Atom™, an i3, an i5, an i7, or an MCU-class processor, or another such processor available from Intel® Corporation. The processors of the application circuitry 1202 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1202 may be a part of a system on a chip (SoC) in which the application circuitry 1202 and other components are formed into a single integrated circuit, or a single package, such as the Edison™ or Galileo™ SoC boards from Intel® Corporation.

Additionally or alternatively, application circuitry 1202 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1204 may be implemented, for example, as a solder-down substrate including one or more integrated circuits, a single packaged integrated circuit soldered to a main circuit board or a multi-chip module containing two or more integrated circuits.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1206, which incorporates both mmWave antennas and sub-mmWave.

The memory circuitry 1208 may include any number and type of memory devices used to provide for a given amount of system memory. As examples, the memory circuitry 1208 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1208 may be developed in accordance with a Joint Electron Devices Engineering Council (JEDEC) low power double data rate (LPDDR)-based design, such as LPDDR2, LPDDR3, LPDDR4, or the like. Memory circuitry 1208 may be implemented as one or more of solder down packaged integrated circuits, single die package (SDP), dual die package (DDP), or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1208 maybe on-die memory or registers associated with the application circuitry 1202. To provide for persistent storage of information such as data, applications, operating systems and so forth, memory circuitry 1208 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1200 may incorporate the three-dimensional (3D) cross-point (XPOINT) memories from Intel® and Micron®.

The removable memory 1226 may include devices, circuitry, enclosures/housings, ports or receptacles, etc. used to couple portable data storage devices with the platform 1200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1200 may also include interface circuitry (not shown) that is used to connect external devices with the platform 1200. The external devices connected to the platform 1200 via the interface circuitry include sensors 1222 and electro-mechanical components (shown as EMCs 1224), as well as removable memory devices coupled to removable memory 1226.

The sensors 1222 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1224 include devices, modules, or subsystems whose purpose is to enable platform 1200 to change its state, position, and/or orientation, or move or control a mechanism or (sub)system. Additionally, EMCs 1224 may be configured to generate and send messages/signaling to other components of the platform 1200 to indicate a current state of the EMCs 1224. Examples of the EMCs 1224 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1200 is configured to operate one or more EMCs 1224 based on one or more captured events and/or instructions or control signals received from a service provider and/or various clients. In some implementations, the interface circuitry may connect the platform 1200 with positioning circuitry 1216.

In some implementations, the interface circuitry may connect the platform 1200 with Near-Field Communication circuitry (shown as NFC circuitry 1212). The NFC circuitry 1212 is configured to provide contactless, short-range communications based on radio frequency identification (RFID) standards, wherein magnetic field induction is used to enable communication between NFC circuitry 1212 and NFC-enabled devices external to the platform 1200 (e.g., an "NFC touchpoint"). NFC circuitry 1212 comprises an NFC controller coupled with an antenna element and a processor coupled with the NFC controller. The NFC controller may be a chip/IC providing NFC functionalities to the NFC circuitry 1212 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1212, or initiate data transfer between the NFC circuitry 1212 and another active NFC device (e.g., a smartphone or an NFC-enabled POS terminal) that is proximate to the platform 1200.

The driver circuitry 1218 may include software and hardware elements that operate to control particular devices that are embedded in the platform 1200, attached to the platform 1200, or otherwise communicatively coupled with the platform 1200. The driver circuitry 1218 may include individual drivers allowing other components of the platform 1200 to interact with or control various input/output (I/O) devices that may be present within, or connected to, the platform 1200. For example, driver circuitry 1218 may include a display driver to control and allow access to a display device, a touchscreen driver to control and allow access to a touchscreen interface of the platform 1200, sensor drivers to obtain sensor readings of sensors 1222 and control and allow access to sensors 1222, EMC drivers to obtain actuator positions of the EMCs 1224 and/or control and allow access to the EMCs 1224, a camera driver to control and allow access to an embedded image capture device, audio drivers to control and allow access to one or more audio devices.

The power management integrated circuitry (shown as PMIC 1210) (also referred to as "power management circuitry") may manage power provided to various components of the platform 1200. In particular, with respect to the baseband circuitry 1204, the PMIC 1210 may control power-source selection, voltage scaling, battery charging, or DC-to-DC conversion. The PMIC 1210 may often be included when the platform 1200 is capable of being powered by a battery 1214, for example, when the device is included in a UE.

In some embodiments, the PMIC 1210 may control, or otherwise be part of, various power saving mechanisms of the platform 1200. For example, if the platform 1200 is in an RRC_Connected state, where it is still connected to the RAN node as it expects to receive traffic shortly, then it may enter a state known as Discontinuous Reception Mode (DRX) after a period of inactivity. During this state, the platform 1200 may power down for brief intervals of time and thus save power. If there is no data traffic activity for an extended period of time, then the platform 1200 may transition off to an RRC Idle state, where it disconnects from the network and does not perform operations such as channel quality feedback, handover, etc. The platform 1200 goes into a very low power state and it performs paging where again it periodically wakes up to listen to the network and then powers down again. The platform 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1214 may power the platform 1200, although in some examples the platform 1200 may be mounted deployed in a fixed location, and may have a power supply coupled to an electrical grid. The battery 1214 may be a lithium ion battery, a metal-air battery, such as a zinc-air battery, an aluminum-air battery, a lithium-air battery, and the like. In some implementations, such as in V2X applications, the battery 1214 may be a typical lead-acid automotive battery.

In some implementations, the battery 1214 may be a "smart battery," which includes or is coupled with a Battery Management System (BMS) or battery monitoring integrated circuitry. The BMS may be included in the platform 1200 to track the state of charge (SoCh) of the battery 1214. The BMS may be used to monitor other parameters of the battery 1214 to provide failure predictions, such as the state of health (SoH) and the state of function (SoF) of the battery 1214. The BMS may communicate the information of the battery 1214 to the application circuitry 1202 or other components of the platform 1200. The BMS may also include an analog-to-digital (ADC) convertor that allows the application circuitry 1202 to directly monitor the voltage of the battery 1214 or the current flow from the battery 1214. The battery parameters may be used to determine actions that the platform 1200 may perform, such as transmission frequency, network operation, sensing frequency, and the like.

A power block, or other power supply coupled to an electrical grid may be coupled with the BMS to charge the battery 1214. In some examples, the power block may be replaced with a wireless power receiver to obtain the power wirelessly, for example, through a loop antenna in the computer platform 1200. In these examples, a wireless battery charging circuit may be included in the BMS. The specific charging circuits chosen may depend on the size of the battery 1214, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1220 includes various input/output (I/O) devices present within, or connected to, the platform 1200, and includes one or more user interfaces designed to enable user interaction with the platform 1200 and/or peripheral component interfaces designed to enable peripheral component interaction with the platform 1200. The user interface circuitry 1220 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1200. The output device circuitry may also include speakers or other audio emitting devices, printer(s), and/or the like. In some embodiments, the sensors 1222 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1200 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

Example 1 may include an apparatus comprising means to perform one or more elements of any method or process described herein.

Example 2 may include one or more non-transitory computer-readable media comprising instructions to cause an electronic device, upon execution of the instructions by one or more processors of the electronic device, to perform one or more elements of any method or process described herein.

Example 3 may include an apparatus comprising logic, modules, or circuitry to perform one or more elements of a method described in or related to any method or process described herein.

Example 4 may include an apparatus comprising: one or more processors and one or more computer-readable media comprising instructions that, when executed by the one or more processors, cause the one or more processors to perform the method, techniques, or process as described herein.

Example 5 may include a signal in a wireless network as shown and described herein.

Example 6 may include a method of communicating in a wireless network as shown and described herein.

Example 7 may include a system for providing wireless communication as shown and described herein.

Example 8 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for Layer 2 (L2) handling during a cell change procedure at a user equipment (UE), comprising:
    decoding a radio resource control (RRC) reconfiguration message received from a first cell, the RRC reconfiguration message including a Layer 1 (L1) configuration corresponding to a second cell, wherein the first cell and the second cell share a service data adaptation protocol (SDAP) entity, a packet data convergence protocol (PDCP) entity, a radio link control (RLC) entity, and a medium access control (MAC) entity, the first cell and the second cell each having a separate L1 entity;
    in response to decoding the RRC reconfiguration message, storing the L1 configuration corresponding to the second cell;
    decoding a cell change message received from the first cell, the cell change message indicating that a cell change from the first cell to the second cell is to be performed;
    in response to decoding the cell change message, applying the stored L1 configuration corresponding to the second cell for data transmission and reception associated with the second cell; and
    initiating a cell change to the second cell.

2. The method of claim 1, further comprising storing a configuration and a MAC context corresponding to the first cell until determining that changing cells to the second cell is successful.

3. The method of claim 1, wherein the UE does not reset the SDAP entity, the PDCP entity, the RLC entity, or the MAC entity based on the first cell and the second cell sharing the SDAP entity, the PDCP entity, the RLC entity, and the MAC entity.

4. The method of claim 1, further comprising:
    determining that changing cells to the second cell has failed; and
    performing a fallback to the first cell, including:
        releasing the L1 configuration corresponding to the second cell and a MAC context corresponding to the second cell;
        encoding a fallback message for transmission to the first cell, wherein transmitting the fallback message is performed using a stored configuration and MAC context corresponding to the first cell.

5. The method of claim 1, further comprising:
    performing timing advance timer (TATimer) maintenance per cell, including:
        maintaining a timing advance (TA) value and a TATimer corresponding to the first cell prior to changing cells; and
        resetting the TA value and restarting the TATimer with respect to the second cell after changing cells, wherein the UE starts the TATimer upon receiving a TA value corresponding to the second cell or starts the TATimer when transmitting a first UL to the second cell.

6. The method of claim 1, further comprising:
reporting power headroom (PH) corresponding to the first cell and PH corresponding to the second cell to a network associated with the first cell and the second cell, including:
reporting the PH corresponding to the first cell in a first PH reporting (PHR) MAC control element (CE) and the PH corresponding to the second cell in a second PHR MAC CE; or
reporting the PH corresponding to the first cell and the PH corresponding to the second cell in a same PHR MAC CE.

7. The method of claim 1, further comprising triggering a buffer status report (BSR) upon available data arriving in an uplink buffer of the UE.

8. The method of claim 7, wherein the UE cancels a pending BSR in the first cell and triggers a new BSR in the second cell when the available data arrives for transmission to the second cell.

9. The method of claim 7, wherein the UE triggers the BSR in the second cell when there is a pending BSR in the first cell.

10. The method of claim 1, further comprising performing a beam failure recovery (BFR) across the first cell and the second cell.

11. The method of claim 1, further comprising:
detecting a beam failure in the first cell;
detecting a candidate beam in the second cell; and
based on detecting the candidate beam in the second cell, performing the following:
switching to the second cell; and
encoding communications for the second cell using the detected candidate beam.

12. An apparatus for use in a user equipment (UE), comprising:
one or more processors; and
one or more hardware storage devices having stored thereon computer-executable instructions that are executable by the one or more processors to cause the apparatus to perform the following:
decode a radio resource control (RRC) reconfiguration message received from a first cell, the RRC reconfiguration message including a Layer 1 (L1) configuration corresponding to a second cell, wherein the first cell and the second cell share a service data adaptation protocol (SDAP) entity, a packet data convergence protocol (PDCP) entity, a radio link control (RLC) entity, and a medium access control (MAC) entity, the first cell and the second cell each having a separate L1 entity;
in response to decoding the RRC reconfiguration message, store the L1 configuration corresponding to the second cell;
decode a cell change message received from the first cell, the cell change message indicating that a cell change from the first cell to the second cell is to be performed;
in response to decoding the cell change message, apply the stored L1 configuration corresponding to the second cell for data transmission and reception associated with the second cell; and
initiate a cell change to the second cell.

13. The apparatus of claim 12, wherein the one or more hardware storage devices further have stored thereon computer-executable instructions that are executable by the one or more processors to cause the apparatus to perform the following:
perform data transmission and reception for both the first cell and the second cell simultaneously during the cell change when utilizing a separate hybrid automatic repeat request (HARQ) entity for the first cell and the second cell.

14. The apparatus of claim 12, wherein the one or more hardware storage devices further have stored thereon computer-executable instructions that are executable by the one or more processors to cause the apparatus to perform the following:
clear a configured grant (CG) and a semi-persistent scheduling (SPS) at the first cell when initiating the cell change to the second cell.

15. The apparatus of claim 12, wherein upon receiving the cell change indication, a configured grant (CG) and a semi-persistent scheduling (SPS) are enabled at the second cell.

16. The apparatus of claim 12, wherein a discontinuous reception (DRX) variable is maintained according to data scheduling and data activity at both the first cell and the second cell.

17. A method for Layer 2 (L2) handling during a cell change procedure at a user equipment (UE), comprising:
decoding a radio resource control (RRC) reconfiguration message received from a first cell, the RRC reconfiguration message including a Layer 1 (L1) configuration corresponding to a second cell, wherein the first cell and the second cell share a service data adaptation protocol (SDAP) entity and a packet data convergence protocol (PDCP) entity, the first cell and the second cell each having a separate radio link control (RLC) entity, a medium access control (MAC) entity, and an L1 entity;
in response to decoding the RRC reconfiguration message, storing the L1 configuration corresponding to the second cell;
decoding a cell change message received from the first cell, the cell change message indicating that a cell change from the first cell to the second cell is to be performed;
in response to decoding the cell change message, applying the stored L1 configuration corresponding to the second cell for data transmission and reception associated with the second cell; and
initiating a cell change to the second cell.

18. The method of claim 17, further comprising, upon changing cells to the second cell:
resetting the RLC entity and the MAC entity; and
performing PDCP recovery based on an indication from a network associated with the first cell and the second cell.

19. The method of claim 17, further comprising storing a configuration and a context corresponding to the first cell until determining that changing cells to the second cell is successful.

20. The method of claim 17, further comprising:
determining that changing cells to the second cell has failed; and
performing a fallback to the first cell, including:
releasing the L1 configuration corresponding to the second cell; and
encoding a fallback message for transmission to the first cell, wherein transmitting the fallback message is performed using a stored context corresponding to the first cell.

* * * * *